(12) United States Patent
Hunzinger

(10) Patent No.: US 6,834,194 B2
(45) Date of Patent: Dec. 21, 2004

(54) RELATIVE FUTURE ACTIVITY INDICATORS FOR ASSISTING IN SELECTING THE SOURCE OF RECEIVED COMMUNICATIONS

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 457 days.

(21) Appl. No.: 10/095,851

(22) Filed: Mar. 11, 2002

(65) Prior Publication Data

US 2003/0013454 A1 Jan. 16, 2003

Related U.S. Application Data

(60) Provisional application No. 60/274,400, filed on Mar. 9, 2001.

(51) Int. Cl.[7] .................................................. H04M 1/00
(52) U.S. Cl. ................................ 455/452.2; 455/67.11; 455/525; 455/456.5; 370/332; 370/333
(58) Field of Search ........................... 455/452.2, 525, 455/522, 67.11, 456.5, 423, 226.1, 226.2, 156.1, 140, 428, 429, 191.3; 370/254, 332, 333

(56) References Cited

U.S. PATENT DOCUMENTS

| | | | | |
|---|---|---|---|---|
| 6,141,565 A | * | 10/2000 | Feuerstein et al. | 455/560 |
| 6,282,427 B1 | * | 8/2001 | Larsson et al. | 455/456.2 |
| 6,385,454 B1 | * | 5/2002 | Bahl et al. | 455/450 |
| 6,625,135 B1 | * | 9/2003 | Johnson et al. | 370/332 |
| 6,629,151 B1 | * | 9/2003 | Bahl | 709/250 |
| 6,771,609 B1 | * | 8/2004 | Gudat et al. | 370/254 |
| 2003/0016655 A1 | * | 1/2003 | Gwon | 370/352 |

* cited by examiner

Primary Examiner—Congvan Tran
(74) Attorney, Agent, or Firm—Morrison & Foerster LLP

(57) ABSTRACT

A method and apparatus is disclosed for providing network access point differential future activity indicator (FAI) bits which includes the direction and magnitude of predicted future activity relative to current activity levels to enable a mobile station (MS) to select a preferred network access point. The network access point computes a predicted future change in activity $\Delta A'(t+1)$ as future predicted activity $A'(t+1)$ minus current actual activity $A(t)$. The predicted future change in activity is translated into FAI bits, which are transmitted to the MS. The FAI bits are also an indication of the expected change in the pilot strength $\Delta PS'_s(t+1)$ for a BS/sector. The MS measures the pilot strengths $PS_s(t)$ of sectors, then biases these pilot strengths using $\Delta PS'_s(t+1)$ to compute a predicted future pilot strength $PS'_s(t+1)=PS_s(t)+\Delta PS'_s(t+1)$ for each sector. The MS then uses the $PS'_s(t+1)$ values to choose the best eligible sector.

38 Claims, 6 Drawing Sheets

RELATIVE FUTURE ACTIVITY INDICATORS FOR ASSISTING IN SELECTING THE SOURCE OF RECEIVED COMMUNICATIONS

CROSS-REFERENCE TO RELATED APPLICATIONS

Embodiments of the present invention claim priority from U.S. provisional patent application Ser. No. 60/274,400 entitled "CDMA Receive Differential Activity Indicator," filed Mar. 9, 2001, the contents of which are incorporated herein by reference for all purposes.

BACKGROUND OF THE INVENTION

1. Field of the Invention

The present invention relates, generally, to communication network management and, in one embodiment, to a method and apparatus for generating and utilizing a relative future activity indicator for selecting the source of received communications.

2. Description of Related Art

Introduction

Cellular communication networks are rapidly becoming a primary infrastructure for enabling communication in today's society. In addition to providing a means for voice communications such as personal or business telephone calls, cellular communication networks are now being used for transmitting data. As demand for cellular communications has increased, cellular communication networks are becoming increasingly prevalent and are providing coverage over larger areas to meet consumer demand.

FIG. 1 illustrates an example system environment including a mobile station (MS) 10 capable of maintaining a connection 30 with a cellular communication network 22 as the MS 10 roves through a geographic area served by the cellular communication network 22. It should be understood that a connection, as referred to herein, includes, but is not limited to, voice, multimedia video or audio streaming, packet switched data and circuit switched data connections, short message sequences or data bursts, and paging. The cellular communication network 22 includes a first base station (BS) 12 communicating over sectors 14 and 16, and a second BS 18 communicating over sector 20. A BS is typically comprised of multiple sectors, usually three. Each BS includes a separate transmitter and antenna (transceiver) for each sector, pointed in the direction of the sector. Because a BS can be omni or sectorized, it should be understood that the terms BS and sector may be used interchangeably herein. Furthermore, when referring to access to a network via a network access point, the terms BS, sector, and network may be used interchangeably herein. The BSs are connected to network infrastructure entities including BS controllers (BSC) 24 that may control a cell cluster 26, and communicate with a mobile switching center (MSC) 28. It should be understood that the MS 10, BSs and one or more of these network infrastructure entities may contain one or more processors for controlling communications between the MS 10 and the network 22. The processors include memory and other peripheral devices well understood by those skilled in the art.

In the course of roving, MS 10 travels from position A to position B to position C and will, as a matter of course, experience variations in signal strength and signal quality of the communication link associated with the BS(s) that it is in contact with. Signal strength and quality can be especially undependable near the edges of the sectors, such as when the MS 10 transitions from the area defined by the dotted line of sector 14 to the area defined by the dotted line of sector 16, or from sector 16 to sector 20.

Cellular Communication Links

FIG. 2 illustrates an exemplary communication link 30 between a MS 10 and a BS 12. Communications from the BS 12 to the MS 10 are called the forward link, and communications from the MS 10 to the BS 12 are called the reverse link. The forward and reverse links utilize a number of forward and reverse channels. For example, the BS 12 communicates with the MSs using a plurality of forward common channels or links which may include, but are not limited to, one or more pilot channels, a sync channel, and one or more paging channels, discussed in greater detail below. These channels are referred to as common channels because the BS 12 may communicate those channels to all MSs in the network. Generally, these common channels are not used to carry data, but are used to broadcast and deliver common information.

Each sector within BS 12 broadcasts a pilot channel that identifies that sector and is simple for a MS 10 to decode. Both sectors and pilot channels are distinguished by pseudo-noise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 12 communicates with individual MSs using a plurality of forward dedicated channels or links which may include, but are not limited to, multiple traffic channels, multiple supplemental channels, and multiple access channels and control channels. These channels are referred to as dedicated channels because the BS communicates the channels to a specific MS 10, and the channels may carry data.

The reverse channels or links may include an access channel and one or more reverse traffic channels and control channels. After a MS receives an incoming page from a BS, the MS will initiate a connection setup using, in part, an access channel.

Cellular Network Communication Schemes

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window.

Code division multiple access (CDMA) is a technique for spread-spectrum multiple-access digital communications that creates channels through the use of unique code sequences. It allows a number of MSs to communicate with one or more BSs in neighboring cell sites, simultaneously using the same frequency. In CDMA, given a space of frequency and time, each channel is assigned a particular orthogonal code such as a Walsh code or a quasi-orthogonal function (QOF). In direct sequence CDMA, the data from each channel is coded using Walsh codes or QOFs and then combined into a composite signal. This composite signal is spread over a wide frequency range at a particular time.

When this composite signal is de-spread using the same code used to spread the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or MS.

Typical CDMA wireless communication systems are fully described by the following standards, all of which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95A, published in 1993; TIA/EIA-95B, published Feb. 1, 1999; TIA/EIA/IS-2000, Volumes 1–5, Release A, published Mar. 1, 2000; TIA/EIA-98D, published Jun. 1, 2001; and WCDMA standards 3GPP TS 25.214 V4.2.0 published September 2001, TS25.401 V5.1.0 published September 2001, TS 25.331 V4.2.0 published Oct. 8, 2001, and TR 25.922 V4.1.0 published Oct. 2, 2001.

As illustrated in FIG. 3, a channel 32 may be broken up into superframes or slots 42, typically of 80 millisecond duration. Each slot may be divided into three phases 44. These phases are numbered 0, 1 and 2 in FIG. 3. Coincident with the timing of the phases are four frames 34. These four frames are aligned with the three phases at the superframe boundaries. Each frame 34 is therefore typically 20 milliseconds long. Other frame sizes such as 5 ms, 10 ms and multiples of 20 ms can also be used. A message is typically comprised of one or more frames.

Within a superframe, preambles of various lengths can be transmitted prior to transmission of the frames, for example, in the case of reverse access channels and reverse common control channels. It should be understood that the content of the frames 34 can differ. One frame may contain a header 36, signaling 38 and data 40 multiplexed on different code channels, another may contain only signaling, and yet another may contain only data. Each frame 34 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate. The network capacity can be increased as the interference is reduced.

Packet Data Communications

In response to increased demand for packet data communications at increasingly higher data rates, High Data Rate (HDR) standards have been developed. The 1×EV-DO (HDR) standard (1× the bandwidth of IS-95, EVolution, Data Only, High Data Rate) supports only data transmissions and is incompatible with the IS-95 and IS-2000 standards mentioned above. These shortcomings are being addressed by the development of the 1×EV-DV standard (1× the bandwidth of IS-95, EVolution, Data and Voice), which will support both data and voice and be compatible with IS-95 and IS-2000.

FIG. 4 illustrates an example system environment 46 comprising three BSs A, B, and C and a MS 10 within the coverage area for all of them. In the example of FIG. 4, the communication system is 1×EV-DV so both voice and data are capable of being transmitted. Thus, the MS 10 may receive voice communications, control and overhead information 48 from BS A while simultaneously maintaining a packet data communication link 50 with BS C for a web browsing session.

Because the MS 10 is within the coverage area of BSs A, B, and C, the MS may maintain an active/eligible set of A, B and C for voice communications, control and overhead. If the MS 10 moves outside the range of one of the BSs, the MS 10 may request to modify its active/eligible set accordingly. If the MS maintains simultaneous voice communication links with more than one BS, the MS would be in soft or softer handoff.

On the other hand, a MS will typically not maintain simultaneous packet data communication links with multiple BSs. A MS typically selects, through fast cell selection, one (but only one) BS (network access point) in its active/eligible set for establishing a packet data communication link. Fast cell selection is a feature of communication systems such as those described in the cdma 1×EV-DO (HDR) and 1×EV-DV standards. To select the best BS/sector from which to receive packet data transmissions, the MS first determines the strength of the signal from the BSs (e.g., the carrier to interference ratio C/I). The MS may also estimate the future signal strength of any particular channel being received from a BS based on current and historical measurements maintained by the MS. Once a BS is selected by the MS, an identification of the BS is transmitted to the network. From this transmission, the network then identifies all MSs that have selected the same BS, and chooses the MS that is best receiving the BS. This methodology is related to a proportionally fair scheduling system wherein the user who best receives the data is given priority in a manner that also considers the latency impact to each user.

As noted above, the MS may estimate the future signal strength of any particular channel being received from a BS based on current and historical measurements maintained by the MS. However, the MS does not have any indication of future interference levels that may exist due to other transmissions or inter-cell interference. Such information may affect the quality of the transmission from the channel. Therefore, during development of the HDR standards, a forward activity bit (FAB) was proposed to augment the fast cell selection process. In this proposal, a BS would transmit a FAB to a MS, providing some indication of expected future transmissions on the forward traffic channel so that the MS can better decide which BS will be best for receiving the forward traffic channel. The FAB would indicate either some expected future activity or no expected future activity. No indication of how much activity would be provided. An improvement to the original FAB was later proposed in which an additional bit would be provided that indicated either some or no activity for odd and even slots.

One drawback to the proposed FAB schemes is that the FABs do not provide any indication of the direction or magnitude of the predicted future activity relative to current activity levels (e.g., higher or lower, and by how much). Such information would enable the MS to even more accurately predict which BS (network access point) will be best to connect/handoff to (receive forward frames from).

Another drawback in systems that may transmit to more than one user is that a distinction cannot be made between a situation in which the full forward link bandwidth is in use and one in which some bandwidth is available for additional traffic even though there is activity.

Therefore, a need exists for a method and apparatus for generating and utilizing a relative future activity indicator that provides an indication of the direction and magnitude of the predicted future activity relative to current activity levels for the purpose of enhancing the selection of the source of received communications.

SUMMARY OF THE INVENTION

In fast cell selection, the MS selects one or more potential network access points to receive from (i.e. the forward link active/eligible set). To select the best BS/sector from which to receive transmissions, the MS can determine the strength of the signal from the BS (e.g., the carrier to interference ratio C/I). The MS may also estimate the future signal strength of any particular channel being received from a BS based on current and historical measurements maintained by the MS. Once a BS is selected by the MS, an identification of the BS is transmitted to the network. From this transmission, the network then identifies all MSs that have selected the same BS, and chooses the MS that is best receiving the BS.

Embodiments of the present invention provide a future activity indicator including the direction and magnitude of predicted future activity relative to current activity levels (e.g., higher or lower, and by how much) to enable the MS to even more accurately predict which BS (network access point) will be best to connect/handoff to (receive forward frames from). The future activity indicator may comprise one or more future activity indicator (FAI) bits.

To determine and transmit FAI bits, the BS first determines its current actual activity or interference level $A(t)$, and then may determine its resource assignments, connections, scheduling and expected reconnects (in other words, the expectation of future transmissions or activity). The BS then predicts future activity from this determined expectation of future activity. The future predicted activity is designated $A'(t+1)$, where the prime indicates that the future activity is predicted. The BS then computes the predicted future change in activity $\Delta A'(t+1)$ as the future predicted activity $A'(t+1)$ minus the current actual activity $A(t)$. The predicted future change in activity $\Delta A'(t+1)$ is translated into FAI bits using a mapping into a table or a calculation or formula, and these FAI bits are transmitted to the MS on the forward link.

The MS receives the FAI bits corresponding to $\Delta A'(t+1)$ from one or more BSs/sectors, decodes them and stores them. Note that in one embodiment the FAI bits may be interpreted as an indication of the expected change in the pilot strength $PS_s(t)$ for a BS/sector, i.e. $\Delta PS'(t+1)$. The MS also measures the pilot strengths $PS'_s(t)$ of sectors eligible to be serving sectors. The measured pilot strength of each BS/sector is then biased using relative pilot strength bias values corresponding to the received FAI bits. Such biasing may be accomplished, for example, by adding the expected change in pilot strength $\Delta PS'_s(t+1)$ to the pilot strength $PS_s(t)$ to compute a predicted future pilot strength $PS'_s(t+1)=PS_s(t)+\Delta PS'_s(t+1)$. The best eligible sector is selected as the desired serving sector, and a corresponding indication of the best eligible sector is then sent to the BS over the reverse link. This message is a request by the MS that future transmissions originate from the selected BS/sector, but the network is typically the final arbiter of the cell selection, and may override this request and select another BS.

DETAILED DESCRIPTION OF PREFERRED EMBODIMENTS

Figure 1:
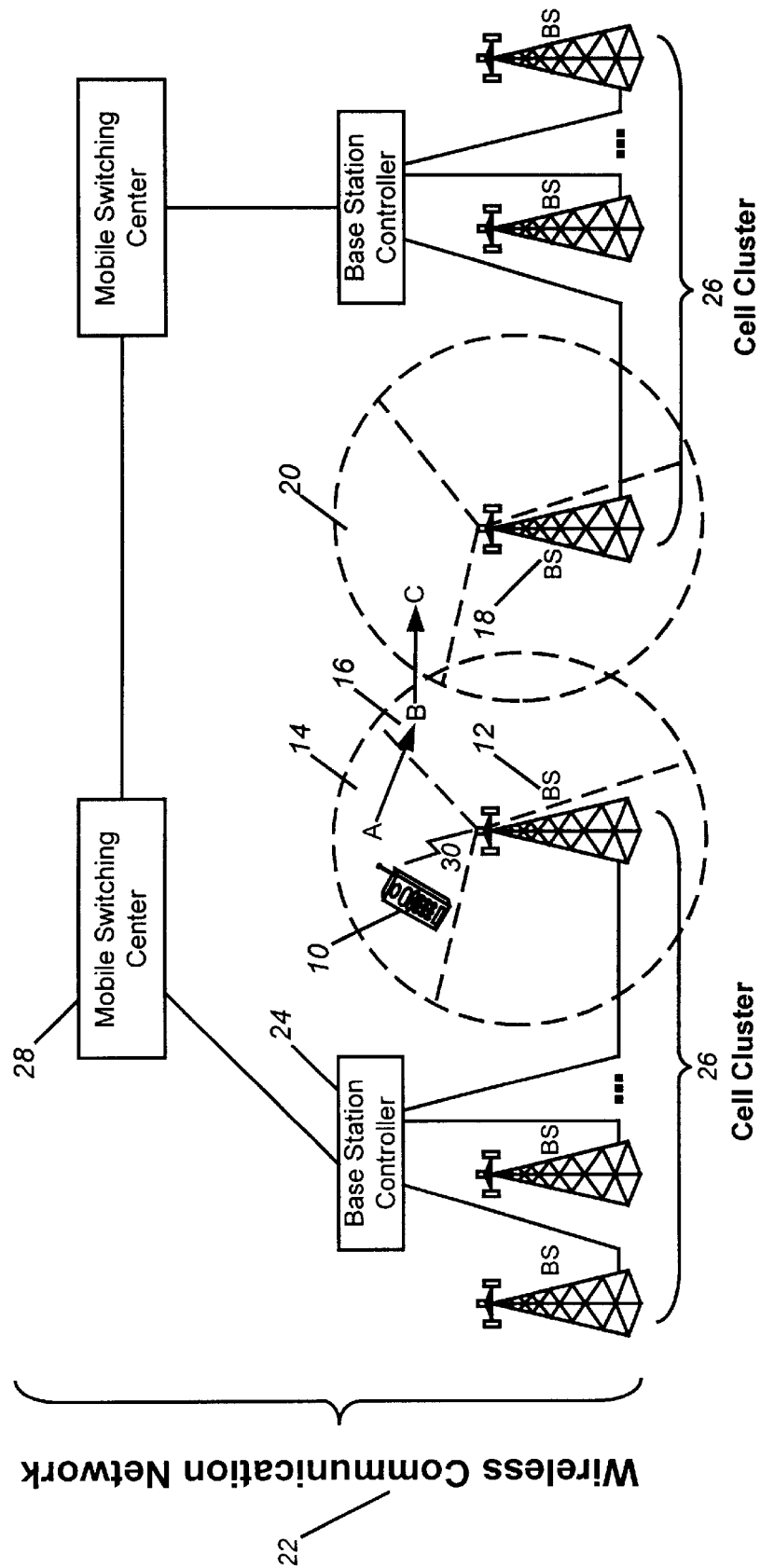
FIG. 1 illustrates an example system environment including a mobile station capable of maintaining a connection with a cellular communication network as the MS roves through a geographic area served by the cellular communication network.
Figure 2:
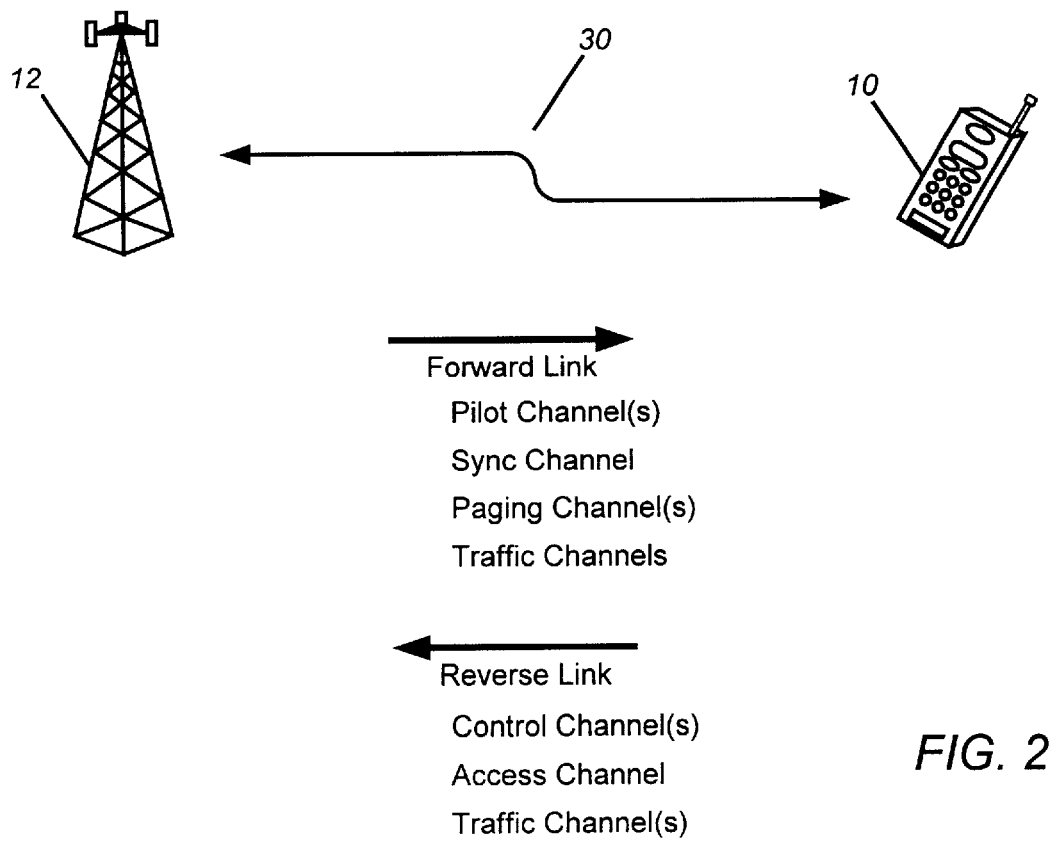
FIG. 2 illustrates an exemplary communication link between a mobile station and a base station in a wireless communication system.
Figure 3:
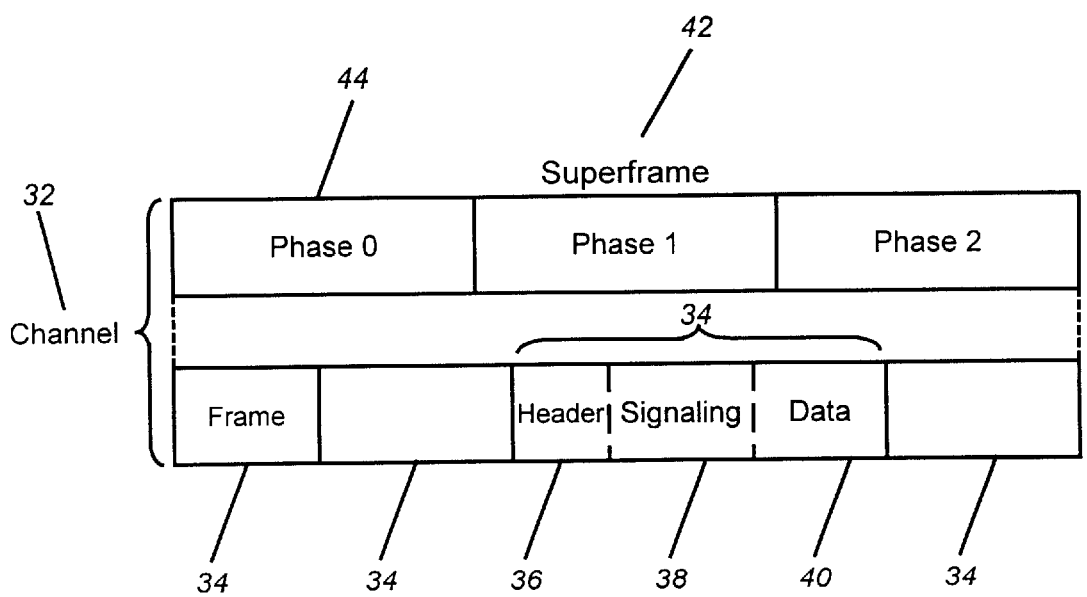
FIG. 3 is a timeline of a superframe divided into three phases and four frames for use in a wireless communication system.
Figure 4:
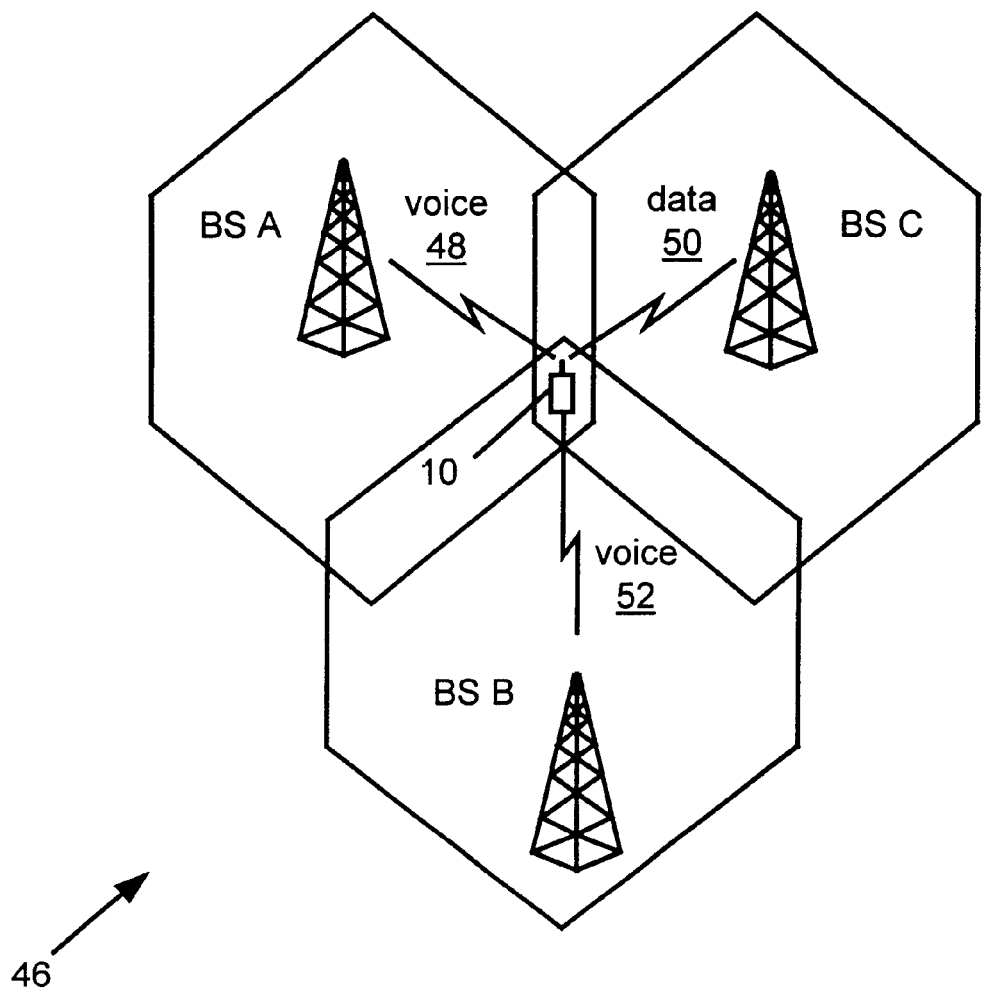
FIG. 4 illustrates an example system environment comprising three BSs and a MS within the coverage area for all of them, wherein the MS has established a packet data communications link with one BS and a voice communication link with one or more BSs.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may primarily reference the CDMA communication protocol (code-based protocols) and the communication of messages for purposes of explanation only, embodiments of the present invention are applicable to other communication protocols and digital radio technologies generally, and include, but are not limited to, CDMA, TDMA, FDMA, GSM, GPRS, and the like. Furthermore, in addition to the communication of messages, other types of information blocks, frames or packets used in the communication of information fall within the scope of the present invention.

In fast cell selection, the MS selects one or more potential network access points to receive from (i.e. the forward link active/eligible set). To select the best BS/sector from which to receive transmissions, the MS can determine the strength of the signal from the BS (e.g., the carrier to interference ratio C/I). The MS may also estimate the future signal strength of any particular channel being received from a BS based on current and historical measurements maintained by the MS. Once a BS is selected by the MS, an identification of the BS is transmitted to the network. From this transmission, the network then identifies all MSs that have selected the same BS, and chooses an MS based on a scheduling algorithm, for example, selecting the MS that is best receiving the BS.

Embodiments of the present invention provide an indication of the direction or magnitude of the predicted future activity relative to current activity levels (e.g., higher or lower, and by how much) to enable the MS to even more accurately predict which BS (network access point) will be best to connect/handoff to (receive forward frames from).

It should be understood that although the descriptions contained herein may reference fast cell selection for purposes of illustration only, embodiments of the present invention are applicable to any selection process wherein a receiving entity must select one or more transmitting entities from which to receive communications or otherwise base decisions on future activity. These receiving entities and transmitting entities may include MSs and BSs, or more generally, transceivers. Embodiments of the present invention may be particularly relevant in adhoc networks where MSs/transceivers may also be broadcasting to other MSs/transceivers. In addition, although the fast cell selection process described herein involves the selection of a BS/sector for forward link communications, embodiments of the present invention are applicable to both forward and reverse link communications, (i.e. providing either or both forward and reverse link activity indicators).

Generation of Future Activity Indicator Bits

Embodiments of the present invention communicate a future activity indicator from one or more BSs/sectors/network access points to a MS to assist the MS in selecting a source of received communications. The future activity indicator may be broadcast or transmitted over an overhead channel or information channel, for example. The Medium Access Control (MAC) function may determine which physical channel the information is conveyed upon. The MAC function is typically considered as a sublayer or part of the Open Systems Interconnect (OSI) Data Link Control Layer (Layer 2). The MAC sublayer typically maps logic channels to physical channels. Thus the MAC may be configured to map future activity bit information (which may be defined alone or in addition to other information, as a logical channel) to any one or more of a number of available physical channels depending on implementation. (The IS-2000.3-A protocol specifies the MAC sub-layer standard.) The future activity indicator will indicate whether or not there will be an increase or decrease in traffic (for example on the same network access point's traffic channel (s)) from current traffic levels, and may also indicate the expected magnitude of the increase or decrease.

In one embodiment the BS may transmit, for example, one or more future activity indicator (FAI) bits to indicate a signed FAI value or table index that indicates either directly or indirectly how much and in which direction the traffic will be changed. For example, if the data rate will be doubled (an increase in activity), the FAI value could be set to 2 (a direct indicator). If the data rate will remain constant, then the FAI value could be set to 0. Power levels may also be used to influence the FAI value. If the aggregate power level of the channel(s) to be received is expected to increase (all other factors being equal), then the BS may increase the FAI value. Power levels may also be influenced by the number of users, data rates, and the like. In general, anything that relates to activity may be used as input.

In another example embodiment of the present invention illustrated in Table 1 below, only one FAI bit may be transmitted wherein, for example, a 1 could indicate a future activity expectation (FAE) of increased future activity, and a 0 could indicate an expected decrease. Although this embodiment does not convey the magnitude of the expected change, the MS may now compare future activity relative to current activity.

TABLE 1

| Future Activity Expectation | Future Activity Indicator Bit |
|---|---|
| Activity to increase | 1 |
| Activity to decrease | 0 |

If the BS is capable of transmitting more FAI bits, the magnitude of the expected change may also be communicated. In another example embodiment of the present invention illustrated in Table 2, three FAI bits (an indirect indicator) may be communicated. Each bit pattern represents a different FAE for the transmitting BS. For example, the bit pattern 011 is transmitted when the BS expects the activity to increase aggressively. In the example of Table 2, the BS associates an aggressive increase in activity with a change or bias to the pilot strength of −6 dB. In other words, because the BS anticipates an aggressive increase in activity, the BS equates this with a bias to the MS selection process equivalent to a pilot strength decrease by 6 dB. Note that if the BS predicts a FAE of no expected change, the FAI bits are 000, and the BS predicts a change in pilot strength of 0 dB. On the other hand, if the BS has no estimate, the FAI bits are 100.

TABLE 2

| Future Activity Expectation | Future Activity Indicator Bits | Expected Change in Pilot Strength (dB) |
|---|---|---|
| Activity to increase aggressively | 011 | −6 dB |
| Activity to increase moderately | 010 | −4 dB |
| Activity to increase slightly | 001 | −2 dB |

TABLE 2-continued

| Future Activity Expectation | Future Activity Indicator Bits | Expected Change in Pilot Strength (dB) |
|---|---|---|
| No expected change | 000 | 0 dB |
| Activity to decrease slightly | 111 | +2 dB |
| Activity to decrease moderately | 110 | +4 dB |
| Activity to decrease aggressively | 101 | +6 dB |
| No estimate available | 100 | unknown |

Figure 5:
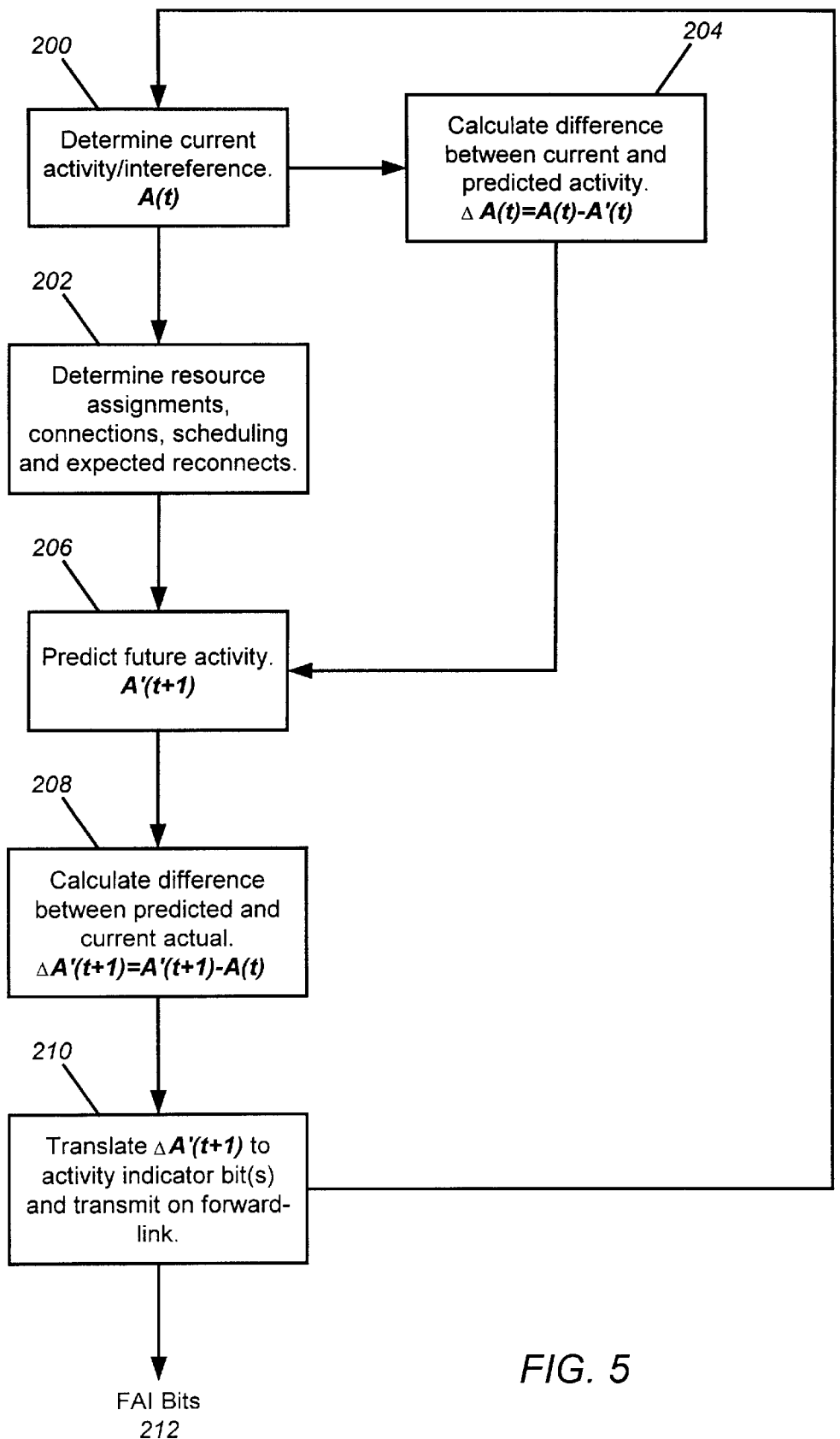
FIG. 5 is a flowchart illustrating how the BS determines a predicted Forward Activity Expectation (FAE) and transmits FAI bits according to an embodiment of the present invention.

FIG. 5 is a flowchart illustrating how the BS determines a predicted FAE and transmits FAI bits according to an embodiment of the present invention. One or more processors and other peripheral devices within the BSs and network, well understood by those skilled in the art, may be employed to perform the steps of FIG. 5. At 200, the BS determines its current actual activity or interference level A(t). This may be accomplished in several ways, but it should be understood that this current activity value, whether represented as a relative or absolute value, is compared to a similarly calculated predicted activity value (relative or absolute value), and therefore is important only relative to the predicted activity value. The BS's current actual activity may be determined by looking at feedback or a number of relative measures. For example, MSs or other reference points (BSs or other measurement devices) may measure interference or activity levels and provide that information back to the BS as feedback. In another example, activity may be determined based on a BS's current level of transmit power for all the channels as compared to its maximum total power allocation. The BS may also determine current activity by knowing how much bandwidth is being used as compared to its total available bandwidth. Using data rates as an example, if data rate X is currently being used out of Y available bandwidth, then one measure of current activity would be X/Y. Other measures of current activity or interference include the number of channels being utilized by the BS (where the channels are known to be operating at certain data rates), or the number of slots that are used up or available in a time division multiplexing (TDM) system. Other measures of activity include the number of transcoders or other system resources in usage.

The preceding paragraph described various measures of activity for a BS communicating over the forward link for purposes of illustration only. However, as noted above, the present invention is not limited to the forward link. In reverse link embodiments of the present invention, the MS can also determine its current activity using some of the same activity measures described with respect to the forward link, such as transmit power, bandwidth being used, data rates, or MS resources in usage.

Referring again to FIG. 5, at 202 the BS may determine its resource assignments, connections, scheduling and expected reconnects (in other words, the expectation of future transmissions). This expectation of future transmissions may be dependent on the scheduling algorithm being implemented in the BS. A BS may implement a scheduling algorithm (as in the case of future standards such as 1×EV-DV (IS-2000-C)) where the BS schedules communications based on various factors such as fairness, delay, bandwidth, efficiency, etc. The BS may also typically have buffers of user data (or these may reside in other connected network entities). The BS (or other entity) also typically has retransmission information (buffers, counts, etc) available. Some or all of this information may be readily available for the BS to use in determining a future activity level. For example, if the BS is scheduling a high bandwidth transmission in the future to another user, constituting a relatively large increase in activity, that would increase the expectation of high future transmission activity. The expectation of future activity may depend on the algorithm in use and the amount of advance scheduling (i.e. how far in advance transmissions are scheduled, how long transmissions are in duration, the state of the BS queues, and previously received requests. In a process similar to that described with respect to step 200, the expectation of future transmissions can be translated into expected changes in activity, such as expected changes in transmit power, bandwidth, data rate, number of channels or slots being used, or number of system resources being used. For example, a BS can predict future increases in activity due to a backlog of connection requests, call establishments, and the like. A BS can predict future decreases in activity by observing that its buffers are empty, it has no record of any MS requests for a session, no sessions are up, or if a number of MSs just made requests to terminate their connections.

In another example, if the BS knows its going to be transmitting a traffic channel at a known power level, and knows the relationship between the traffic and pilot channels, the BS can estimate the transmit power level of the pilot channel. If the BS also knows (from feedback channels) the power at which the MS is receiving the BS's pilot channel, the BS may be able to approximate the degradation of the pilot channel (and therefore the traffic channel) as a dB value. This degradation value can be used to predict future activity.

Ignoring optional step 204 for the moment, at 206, the BS predicts future activity from the expectation of future activity developed at 202. The future predicted activity is designated A'(t+1), where the prime indicates that the future activity is predicted.

At 208, the predicted future change in activity $\Delta A'(t+1)$ is computed as the future predicted activity A'(t+1) minus the current actual activity A(t). At 210, the predicted future change in activity $\Delta A'(t+1)$ is translated into FAI bits using a mapping into a table or a calculation or formula, and these FAI bits are transmitted to the MS on the forward link 212. In one embodiment of the present invention, the BS transmits FAI bits representing the predicted change in activity for that BS. However, in another embodiment, network communications allow a BS to transmit FAI bits corresponding to the predicted change in activity for another BS. After 210, the flowchart loops back to 200, and the time is incremented from current time t to t+1. Note that the predicted future activity A'(t+1) of 206 becomes A'(t) of 204 once the flowchart has looped forward to the next time period.

As noted above, block 204 is optional. At 204, the difference between the future predicted activity A'(t) for time t (determined during the previous time period t−1) and what was measured for the current time period A(t) at 200 is computed. This difference is a prediction error $\Delta A(t)$, which may then be fed back into the computation of the predicted future activity for the next time period at 206, where it will adjust the predicted future activity for the next time period. In one embodiment, the prediction error $\Delta A(t)$ will be directly added to or subtracted from the predicted future activity for the next time period A'(t+1). In an alternative embodiment, past $\Delta A(t)$ values could be filtered (averaged) and directly added to or subtracted from the predicted future activity for the next time period A'(t+1). In further embodiments, the prediction error $\Delta A(t)$ may be used to limit the predicted future activity for the next time period A'(t+1) to a range of values established by past prediction error values.

Note that in an embodiment of the invention, the BS computes the predicted future change in activity $\Delta A'(t+1)$ relative to the current actual activity level $A(t)$ (see 208), not relative to any BS prediction. This is significant with regard to the stability of the BS's predictions. For example, if the method of FIG. 5 utilized a scheme wherein predicted future changes in activity were generated relative to previous BS predictions of activity, the predictions could become unstable and increasingly inaccurate because introduced errors would not be ignored or self-correcting. However, because FIG. 5 references the BS's current actual activity, the predicted future change in activity $\Delta A'(t+1)$ will be correct as of the last time period (i.e. there will be no accumulated error).

Future Activity Indicator Bits and Sector Selection

In fast cell selection, the MS selects one or more potential BSs/network access points to receive from (i.e. the forward link active/eligible set). Embodiments of the present invention provide FAI bits (see, e.g. Table 2) from one or more BSs in the eligible set to the MS to assist the MS in selecting the best BS from which to receive transmissions. These FAI bits are based on information known or predicted by the BS.

To select the best BS/sector from which to receive transmissions, the MS may first determine the current signal to noise ratio (e.g., the carrier to interference ratio C/I) from the BSs in the eligible set. Alternatively, the Ec/Io ratio (chip energy of the carrier over the combined interference) may be determined. Even though a carrier may be essentially maintained at the same signal strength, i.e. the pilot is transmitted at the same signal strength (as some percentage of the total available power), the pilot may be received at different strengths because of interference. Thus the C/I measurement can be viewed as pilot strength in dB over interference, and typically ranges from −5 to −15 dB, but could range from as much as 0 to −32 dB. In addition, the MS may also estimate the future C/I ratio of any particular channel being received from a BS based on historical measurements. This information may be used in conjunction with the current C/I information to estimate and then select the BS with the highest expected future C/I ratio. However, it should be understood that this historical information will generally be limited to observations made by the MS at the receiving end, and thus will not contain any estimates based on information known or predicted by the BS. Without the FAI bits, the MS would typically select the BS with the highest current or expected future C/I ratio as the BS from which to receive transmissions.

However, in embodiments of the present invention the FAI bits received from the BSs may influence the MS's choice. As illustrated in Table 2, the FAI bits transmitted by the BSs represent a particular FAE and a particular expected change in pilot strength from the perspective of the BS. As the FAI bits are received by the MS, the MS may associate each FAI bit pattern with a particular bias or change to the MS's current or expected future pilot strength, as illustrated in Table 3.

TABLE 3

| Future Activity Indicator Bits | Pilot Strength Bias or Change (dB) |
|---|---|
| 011 | −6 dB |
| 010 | −4 dB |
| 001 | −2 dB |
| 000 | 0 dB |
| 111 | +2 dB |
| 110 | +4 dB |
| 101 | +6 dB |
| 100 | 0 dB |

This bias or change is preferably similar to the BS's expected change in pilot strength (compare Tables 2 and 3), but it need not be identical, for reasons to be discussed below. Generally, however, if the BS transmits FAI bits indicating an expected increase in activity, the MS will associate those FAI bits with a negative pilot strength bias, because higher activity means more traffic, more interference, and a reduced C/I ratio. Conversely, if the BS transmits FAI bits indicating an expected decrease in activity, the MS will associate those FAI bits with a positive pilot strength bias, because lower activity means less traffic, less interference, and an increased C/I ratio. Thus, activity/interference and pilot strength are inversely related. The MS may add this bias to its previously determined current C/I ratio for each BS to account for the expected change in pilot strength caused by the predicted future activity at the BS.

For example, if the MS determines that BS A has a C/I ratio of −5 dB and BS B has a C/I ratio of −10 dB, without the FAI bits the MS would typically choose BS A because it has the higher C/I ratio. However, suppose BS A transmits FAI bits to the MS indicating an expected aggressive increase in activity and a change in pilot strength of −6 dB, while BS B transmits FAI bits to the MS indicating an expected aggressive decrease in activity and a change in pilot strength of +6 dB. The MS may use these FAI bits to bias BS A's C/I ratio by −6 dB, resulting in a biased pilot strength of −5 dB −6 dB=−11 dB, while BS B's C/I ratio may be biased by +6 dB, resulting in a biased pilot strength of −10 dB+6 dB=−4 dB. In this case, after the biasing, the MS would choose BS B because it has the higher biased pilot strength.

Figure 6:
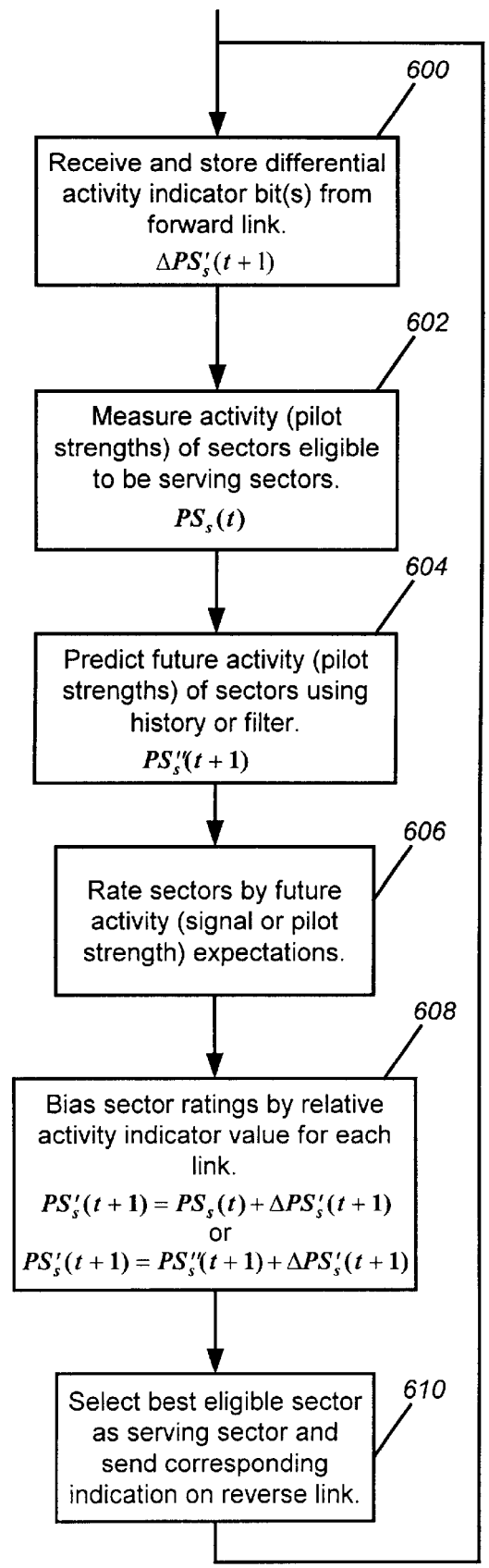
FIG. 6 is a flowchart illustrating how the MS receives FAI bits for BSs/sectors, measures the pilot strengths of the BSs/sectors, biases the pilot strengths in accordance with the FAI bits, and selects the best BS/sector from which to receive communications according to an embodiment of the present invention.

FIG. 6 is a flowchart illustrating how the MS receives FAI bits for BSs/sectors, measures the pilot strengths of the BSs/sectors, adjusts the pilot strengths in accordance with the FAI bits, and selects the best BS/sector from which to receive communications according to an embodiment of the present invention. One or more processors and other peripheral devices within the MS, well understood by those skilled in the art, may be employed to perform the steps of FIG. 6. At 600, the MS receives the differential FAI bits representing a predicted change in future activity level $\Delta A'(t+1)$ from one or more eligible BSs/sectors (see reference character 212 in FIG. 5), decodes them and stores them. The differential FAI bits from each sector S may be used with Table 3, for example, to determine the expected change in the pilot strength $\Delta PS'_s(t+1)$ for that sector (see subscript S), as determined by the sector. Note that time t+1 is used because these values are a prediction of the difference between now and the future.

At 602, which may occur in parallel with 600, the MS measures the current activity (pilot strength) $PS_s(t)$ of sectors eligible to be serving sectors as described above.

At 604, future pilot strengths $PS''_s(t+1)$ of eligible sectors, as determined by the MS, may optionally be predicted by updating the measured pilot strengths $PS_s(t)$ using current and historical results stored in the MS (e.g. filtered or averaged past results). Note that $PS''_s(t+1)=g(PS_s(t))$, where g is a function such as a smoothing infinite impulse response (IIR) filter with time constant or filter length N. It should be understood that while $\Delta PS'_s(t+1)$ determined in step 600 is based on information known by the BS, $PS''_s(t+1)$ determined in step 604 is based on information known by the MS, and hence the "double prime" designation is used in step 604 to signify the difference.

At 606, which is performed only if step 604 is performed, the BSs/sectors are rated in accordance with their future activity (predicted pilot strengths) $PS''_s(t+1)$ determined at 604. The rating of step 606 may consist of ordering or categorizing the BSs/sectors in accordance with their predicted pilot strengths $PS''_s(t+1)$. For example, any sectors with predicted pilot strengths over +5 dB may be categorized as "good," while sectors with predicted pilot strengths less than −18 dB may be categorized as "bad." In addition, the rating performed at 606 may consider other information such as stability/variance over time, history, availability, and the like.

At 608, predicted pilot strength values $PS'_s(t+1)$ for each sector are computed and may be used to rate the sectors. A predicted pilot strength $PS'_s(t+1)$ for each sector can be computed by adding the current pilot strength $PS(t)$ to the expected change in the pilot strength $\Delta PS'_s(t+1)$ determined by the sector:

$$PS'_s(t+1)=PS_s(t)+\Delta PS'_s(t+1).$$

If steps 604 and 606 are performed, the predicted pilot sector may alternatively be computed by adding the predicted pilot strength $PS''_s(t+1)$ determined by the MS to the expected change in the pilot strength $\Delta PS'_s(t+1)$ determined by the sector:

$$PS'_s(t+1)=PS''_s(t+1)+\Delta PS'_s(t+1).$$

These results, $PS'_s(t+1)$ for each sector computed in either of the ways described above, can then be used to bias or further rate the sectors relative to one another or absolutely. Alternatively, $PS''_s(t+1)$ and $PS'_s(t+1)$ may both be used to rate the sectors according to steps 606 and 608 respectively. In addition, if no FAI bits were received in step 600 (e.g. due to a fade), then $PS''_s(t+1)$ alone may be used as the predicted pilot strength $PS'_s(t+1)$ and therefore used to bias or rate the sectors.

Once $PS'_s(t+1)$ is computed for each sector, it may be used to rate the sectors. The rating of step 608 may consist of ordering or categorizing the BSs/sectors in accordance with their predicted pilot strengths $PS'_s(t+1)$. For example, any sectors with predicted pilot strengths over +5 dB may be categorized as "good," while sectors with predicted pilot strengths less than −18 dB may be categorized as "bad." In addition, the rating performed at 608 may consider other information such as stability/variance over time, history, availability, and the like. In another example, the predicted pilot strength $PS'_s(t+1)$ may be averaged with the predicted pilot strength $PS''_s(t+1)$ determined by the MS for each sector, and the averaged results used to rate or order the sectors.

At 610, one or more of the best eligible sectors may be chosen based on the predicted pilot strengths $PS'_s(t+1)$ determined at 608. If step 608 is not performed, then the highest rated BS/sector as identified in step 606 may be chosen as the best eligible sector. Note that step 608 may not be performed if, for example, a fade condition occurs, no FAI bits are received from the BS/sector, and therefore no expected change in pilot strength $\Delta PS'_s(t+1)$ can be determined for each sector. The best eligible sector is selected as the serving sector, and a corresponding indication of the best eligible sector is then sent to the BS over the reverse link. This message is a request by the MS that future transmissions originate from the selected BS/sector, but the network is typically the final arbiter of the cell selection, and may override this request and select another BS. Note that the sector with the strongest pilot strength is not always the one selected by the MS. In some instances, a strong sector may not have the capability needed, such as a particular type of channel available, or its Walsh space may not be continuous. Other factors that may be used by the MS to choose the best sector include whether a sector is in the eligible set, how long it was in the eligible set, how long it is likely to remain in the eligible set, its history of being in the eligible set, the past reliability of reception from that sector, or the sector with the strongest or most stable C/I, pilot strength, or other signal strength measure.

Correlation of Future Activity Indicator Bits

Figure 7:
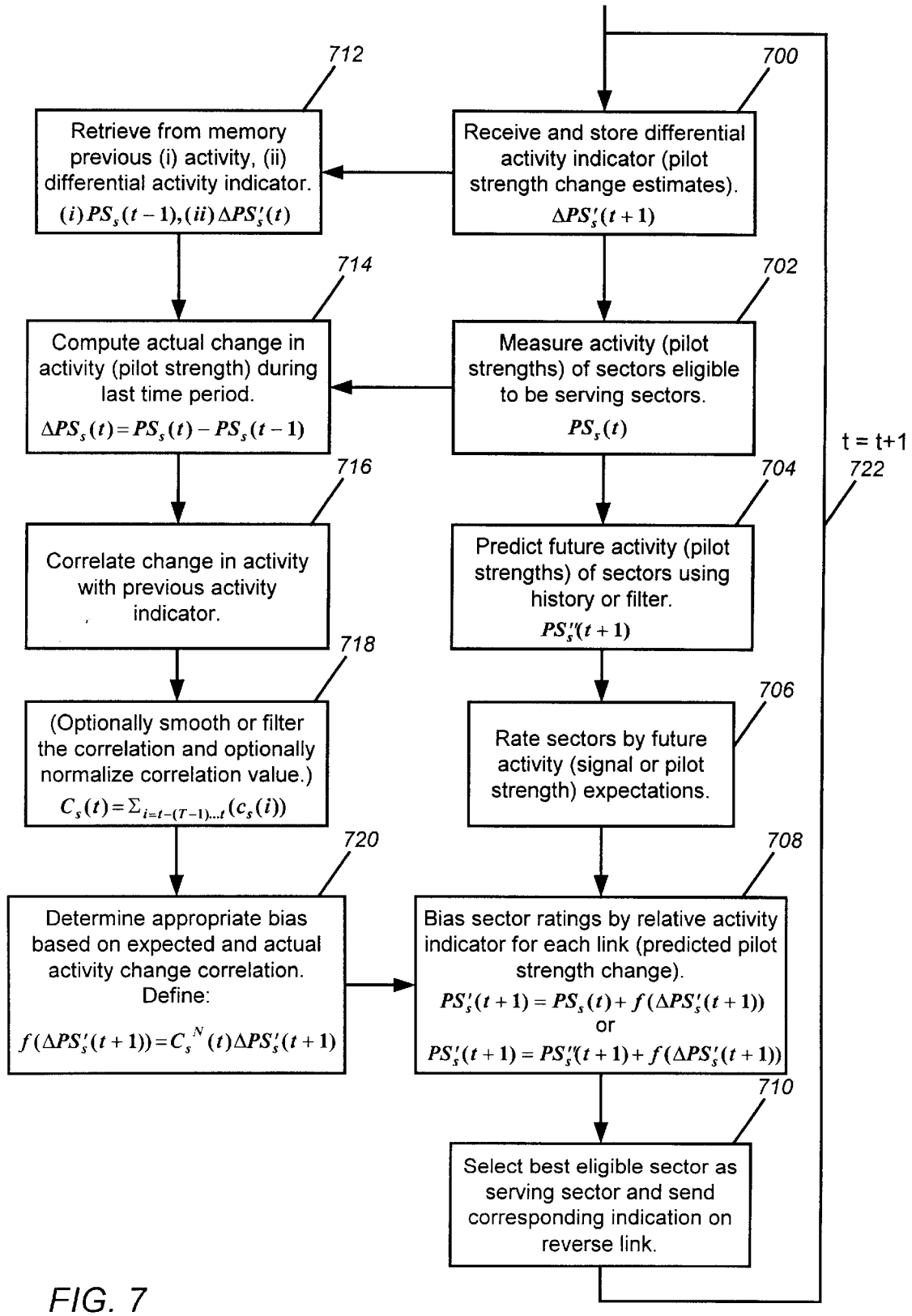
FIG. 7 illustrates another embodiment of the present invention which modifies the embodiment of FIG. 6 by introducing correlation of the FAI bits and error-correction of the biasing applied to the activity (pilot strengths) of the BSs/sectors.

As noted above, FIG. 6 illustrates how the MS receives FAI bits for BSs/sectors, measures the pilot strengths of the BSs/sectors, biases the pilot strengths in accordance with the FAI bits, and selects the best BS/sector from which to receive communications according to an embodiment of the present invention. FIG. 7 illustrates another embodiment of the present invention which modifies the embodiment of FIG. 6 by introducing correlation of the FAI bits and error-correction of the biasing applied to the pilot strengths of the BSs/sectors. One or more processors and other peripheral devices within the MS, well understood by those skilled in the art, may be employed to perform the steps of FIG. 7.

At 700, the MS receives the differential FAI bits representing a predicted change in future activity level $\Delta A'(t+1)$ from one or more eligible BSs/sectors (see reference character 212 in FIG. 5), decodes them and stores them. The differential FAI bits from each sector S may be used with Table 3, for example, to determine the expected change in the pilot strength $\Delta PS'_s(t+1)$ for that sector (see subscript S), as determined by the sector. Note that time t+1 is used because these values are a prediction of the difference between now and the future.

At 712, which may occur in parallel with 700, the MS retrieves from memory the previous activity (actual pilot strength) value $PS_s(t-1)$ and the previous differential activity (pilot strength) indicator $\Delta PS'_s(t)$ for the last time period (t−1) for each BS/sector. Note that $PS_s(t-1)$ is equivalent to the $PS_s(t)$ value determined at step 702 during the previous time period, while $\Delta PS'_s(t)$ is equivalent to the $\Delta PS'_s(t+1)$ value determined at step 700 during the previous time period.

At 702, which may occur in parallel with 700 and 712, the MS measures the current activity (pilot strength) $PS_s(t)$ of sectors eligible to be serving sectors as described above.

At 714, the MS computes the actual change in activity (pilot strength) during the previous time period as $\Delta PS_s(t)=PS_s(t)-PS_s(t-1)$ for each BS/sector.

At 716, the change in activity is correlated with the previous activity indicator according to a predetermined correlation function, and a correlation value c is computed. For example, the correlation function may be defined as $c_t=\Delta PS_s(t)/\Delta PS'_s(t)$. In another example, the correlation function may be defined as $c_t=\Delta PS_s(t)\Delta PS'_s(t)$. In yet another example, the correlation function may be defined as $c_t=1/(\Delta PS_s(t)-\Delta PS'_s(t))$. The correlation value c represents how accurate the previous activity bits were in predicting the change in activity. Note that a different correlation value c is computed for each eligible sector.

At 718, the correlation values c may be optionally smoothed or filtered over a longer period of time for increased accuracy. For a given filter length T, the correlation value c for a particular sector may be filtered by computing $C_t = \Sigma_{i=t-(T-1)\ldots t}(c_i)$. Alternatively, the correlation may be scaled by T, i.e. $C_t = \Sigma_{i=t-(T-1)\ldots t}(c_i/T)$. Instead of a discrete summation, the correlation value may be smoothed using a continuous equivalent, such as an integral. The correlation value $C_t$ may then optionally be normalized to a fraction or percentage or a value ranging between +1 and −1. For example, $C_t$ may be normalized by computing $C_t' = C_t/\text{abs}(\Delta PS_s(t)|_{max} * \Delta PS'_s(t)|_{max})$. In other words, this equation normalizes the correlation value $C_t$ by the product of the maximum values of $\Delta PS_s(t)$ and $\Delta PS'_s(t)$. Alternatively, the correlation value may be normalized using the product of the average values, or the product of the maximum values over some restricted time period.

At 720 the expected change in the activity (pilot strength) $\Delta PS'_s(t+1)$ determined at step 700 is biased by the correlation value $c_t$ or $C_t^N$. In one embodiment, the correlation function is $f(x) = \alpha x$ where $\alpha = c_t^N$ or $C_t^N$. Using the correlation $C_t^N = (\Delta PS_s(t)\Delta PS'_s(t))/Tk$, where k is a normalization factor, as an example:

$$f(\Delta PS'_s(t+1)) = C_t^N \Delta PS'_s(t+1)$$

$$= \left(\sum_{i=t-(T-1)\ldots t}(\Delta PS_s(i)\Delta PS'_s(i)/Tk)\Delta PS'_s(t+1)\right).$$

Note that this function may alternatively use a different normalized correlation value $C_t$ where $c_t = \Delta PS_s(t)/\Delta PS'_s(t)$ as an example:

$$f(\Delta PS'_s(t+1)) = C_t \Delta PS'_s(t+1)$$

$$= \left(\sum_{i=t-(T-1)\ldots t}(\Delta PS_s(i)/\Delta PS'_s(i))/T\right)\Delta PS'_s(t+1).$$

Note that if the predictions stayed the same, the $\Delta PS'_s(t)$ and $\Delta PS'_s(t+1)$ values would cancel, resulting $f(\Delta PS'_s(t+1)) = \Delta PS_s(t)$, the actual previous change.

While steps 716, 718, and 720 are being performed, step 704 may optionally be performed. At 704, future pilot strengths $PS''_s(t+1)$ of eligible sectors, as determined by the MS, may be predicted using current and historical results stored in the MS (e.g. filtered or averaged past results). Note that $PS''_s(t+1) = g(PS_s(t))$, where g is a function such as a smoothing infinite impulse response (IIR) filter with time constant or filter length N. It should be understood that while $\Delta PS'_s(t+1)$ determined in step 700 is based on information known by the BS, $PS''_s(t+1)$ determined in step 704 is based on information known by the MS, and hence the "double prime" designation is used in step 704 to signify the difference.

At 706, which is performed only if step 704 is performed, the BSs/sectors are rated in accordance with their future activity (predicted pilot strengths) $PS''_s(t+1)$ determined at 704. The rating of step 706 may consist of ordering or categorizing the BSs/sectors in accordance with their predicted pilot strengths $PS''_s(t+1)$. For example, any sectors with predicted pilot strengths over +5dB may be categorized as "good," while sectors with predicted pilot strengths less than −18 dB may be categorized as "bad." In addition, the rating performed at 606 may consider other information such as stability/variance over time, history, availability, and the like.

At 708, predicted pilot strength values $PS'_s(t+1)$ for each sector are computed and may be used to rate the sectors. The predicted pilot strength $PS'_s(t+1)$ for each sector may be computed by adding the current pilot strength $PS(t)$ to the biased expected change in the pilot strength $f(\Delta PS'_s(t+1))$ determined by the sector (from step 720):

$$PS'_s(t+1) = PS_s(t) + f(\Delta PS'_s(t+1)).$$

If steps 704 and 706 are performed, the predicted pilot strength $PS'_s(t+1)$ for each sector may alternatively be computed by adding the predicted pilot strength $PS''_s(t+1)$ determined by the MS to the biased expected change in the pilot strength $f(\Delta PS'_s(t+1))$ determined by the sector (from step 720):

$$PS'_s(t+1) = PS''_s(t+1) + f(\Delta PS'_s(t+1)).$$

These results, $PS'_s(t+1)$ for each sector computed in either of the ways described above, can then be used to bias or further rate the sectors relative to one another or absolutely. Alternatively, $PS''_s(t+1)$ and $PS'_s(t+1)$ may both be used to rate the sectors according to steps 706 and 708 respectively.

Once $PS'_s(t+1)$ is computed for each sector (the value(s) may be computed once or more for each sector in one or more ways), it (or they) may be used to rate the sectors. The rating of step 708 may consist of ordering or categorizing the BSs/sectors in accordance with their predicted pilot strengths $PS'_s(t+1)$. For example, any sectors with predicted pilot strengths over +5 dB may be categorized as "good," while sectors with predicted pilot strengths less than −18 dB may be categorized as "bad." In addition, the rating performed at 708 may consider other information such as stability/variance over time, history, availability, and the like. In another example, the predicted pilot strength $PS'_s(t+1)$ may be averaged with the predicted pilot strength $PS''_s(t+1)$ determined by the MS for each sector, and the averaged results used to rate or order the sectors.

Alternatively, when no FAI bit(s) are received, for example, the predicted future value $PS'_s(t+1)$ may be computed as simply $PS''_s(t+1)$.

In other embodiments, if the accuracy of the previous FAI bits was poor as represented by the correlation value, the MS may be instructed to use the actual measured pilot strength values $PS(t)$ and ignore any biased expected change in pilot strength $f(\Delta PS'_s(t+1))$. In other words, the equation would be simply $PS'_s(t+1) = PS_s(t)$.

At 710, the best eligible sector may be chosen based on the biased sector ratings (or related or similar factors such as predicted pilot strengths $PS'_s(t+1)$) determined at 708. If step 708 is not performed, then the highest rated BS/sector as identified in step 706 may be chosen as the best eligible sector. Note that step 708 may not be performed if, for example, a fade condition occurs, no FAI bits are received from the BS/sector, and therefore no expected change in pilot strength $\Delta PS'_s(t+1)$ can be determined for each sector. The best eligible sector is selected as the serving sector, and a corresponding indication of the best eligible sector is then sent to the BS over the reverse link. This message is a request by the MS that future transmissions originate from the selected BS/sector, but the network is typically the final arbiter of the cell selection, and may override this request and select another BS. Note that the sector with the strongest pilot strength is not always the one selected by the MS. In some instances, a strong sector may not have the capability needed, such as a particular type of channel available, or its Walsh space may not be continuous. Other factors that may be used by the MS to choose the best sector include whether a sector is in the eligible set, how long it was in the eligible set, how long it is likely to remain in the eligible set, its history of being in the eligible set, the past reliability of reception from that sector, or the sector with the strongest or most stable C/I, pilot strength, or other signal strength measure. In addition, for each BS/sector the $PS_s(t)$ and $\Delta PS'_s(t+1)$ values are fed forward to the next iteration of FIG. 7, where time increases by one unit, or t=t+1 (see reference character 722). It should further be understood that FIG. 7 may loop on a slot basis such as every 1.25 ms to 80 ms, for example, or more generally, every scheduling period in which a MS can select a new sector (which defines a slot in the present invention).

Note that in the examples of Table 2 and 3 there are FAI bits representing "no expected change," and "no estimate available." Although Table 3 shows that the resulting bias applied by the MS in either case is the same (0 dB), in embodiments of the present invention the MS may further use these two sets of FAI bits in a very different manner. For example, "no expected change" means that the BS/sector made a determination that no change is expected, and thus the MS may accordingly apply no bias. However, "no estimate is available" may mean that the BS/sector was unable to make a determination, or that the network doesn't provide for such estimates or utilize FAI bits, or that the network processor(s) didn't have the time or capability to compute the activity estimate. If the MS receives FAI bits indicating "no estimate is available," the MS may apply no bias, or may apply a bias in accordance with its own knowledge and best guess as to the future pilot strength for that BS. Similarly, if no FAI bits are received, the MS may assume a FAI bit pattern indicating "no estimate available" or "no expected change," or apply a bias in accordance with its own knowledge or best estimation.

Error-Correction of Future Activity Indicator Bits

As described above, when the MS receives FAI bits from a BS/sector in accordance with the BS's predicted expected change in pilot strength, the MS will apply a bias to the measured pilot strength for the BS in accordance with the FAI bits. If the BS's prediction is not correct, the applied bias may be in error. However, due to the MS correlation loop (left side of FIG. 7), the applied bias will be error-corrected.

The error correction loop correlates the BS predictions with the actual MS measured changes. In a typical implementation of correlation function, the sign of the correlation indicates whether the two values are directly related or inversely related and the magnitude indicates how strong the correlation is (a 0 value typically indicating no correlation between the prediction and the measured difference).

In an illustrative example, at time to a BS may make some observations and predict that there will be an expected activity change corresponding to an effective pilot strength difference of −6 dB, and therefore transmit FAI bits 011 corresponding to an "aggressive increase" expectation to the MS (see Table 2). Assuming there is no error correction of the bias applied by the MS (i.e. no left hand side of FIG. 7), if the MS interpretation of an aggressive increase or FAI bits of 011 is also −6 dB (see Table 3), the MS would bias the measured pilot strength for that BS by −6 dB to compute a predicted future pilot strength, then choose the best BS by comparing the predicted future pilot strengths for all of the eligible BSs. If the BS's prediction was correct, and the actual change in pilot strength is −6 dB, the MS's biasing of the measured pilot strength for that BS will be without error. However, if the BS's prediction is wrong, and there was an actual change in pilot strength of only −2 dB, for example, there will be an error introduced in the predicted future pilot strength when the MS biases the measured pilot strengths by −6 dB according to the FAI bits. With this introduced error, the MS may not select the optimum sector. Because there is no error correction, each time the BS interprets conditions, predicts an expected change in pilot strength, and transmits FAI bits to the MS, the MS may generate an erroneous predicted future pilot strength for that BS and furthermore, the MS may not select the optimum BS.

However if error correction of the FAI bits is employed (steps 512–520 at the left hand side of FIG. 7), and if the BS's previous prediction at time $t_0$ was off by +4 dB, for example, during the next time period $t_1$ this error will be determined at 516 and applied to the BS's next prediction of the expected change in pilot strength (say −6 dB again), and the bias will be error-corrected to −2 dB (i.e. −6 dB+4 dB=−2 dB). The MS would then bias the measured pilot strength for that BS by −2 dB to determine a predicted future pilot strength. If the error-corrected bias is correct, and the actual change in pilot strength for that BS is −2 dB, the error has been eliminated.

Continuing the present example for purposes of illustration only, if the actual change in pilot strength for that BS during the time period $t_1$ was −3 dB, then the BS's prediction error has not been completely eliminated. However, at the next iteration of 516 at time $t_2$, it will be determined that there was an error of −1 dB. This error, alone, may be used to error-correct the next applied bias, or alternatively, if step 518 of FIG. 7 is employed, the past errors (e.g. +4 dB at $t_0$ and −1 dB at $t_1$) may be averaged at step 518 before the bias is error-corrected, resulting in a more stable system. Over multiple iterations, the BS's prediction error should be minimized.

As mentioned above, the bias applied by the MS to the measured pilot strength in accordance with the FAI bits (see Table 3) is preferably similar to the BS's expected change in pilot strength associated with those FAI bits (see Table 2), but it need not be identical. If the BS's expected change in pilot strength is different from the MS's applied bias, this difference will also appear as an error. However, due to the MS correlation loop (left side of FIG. 7), regardless of the bias applied by the MS for a particular set of FAI bits, the applied bias will be error-corrected. In other words, the self-correction of the left side of FIG. 5 will correlate the difference and reduce this error, just as it would for an error in the BS's predicted change in pilot strengths.

Consider for example, a MS receiving a number of successive differential activity indicators that are Sector A pilot strength change estimates. Consider the following two as representative: at time $t_1$ the indicator value −6 dB is received and at time $t_2=t_1+1$ the indicator value +6 dB is received. Thus $\Delta PS'_A(t_1+1)=-6$ dB and $\Delta PS'_A(t_1+2)=+7$ dB.

However, the MS is also measuring changes in activity over time (or between time periods). As part of this operation, the MS determines the pilot strength of Sector A at times $t_1$, $t_1+1$, and $t_1+2$ represented by $PS_A(t_1)$, $PS_A(t_1+1)$, and $PS_A(t_1+2)$. Consider the case where these were determined to be −15 dB, −13 dB, and −16 dB respectively. The differences are thus: $\Delta PS_A(t_1+1)=+2$ dB and $\Delta PS_A(t_1+2)=-3$ dB. The result below is obtained by correlating the indicator and determined values according to the discrete correlation equation.

$$C_t = \Sigma_{i=t-(T-1)\ldots t}(\Delta PS_A(t)) = (+2)(-6)+(-3)(+7) = -33$$

This value may be normalized first by the number of time periods used (i.e. 2) and second by the magnitudes of the indicator values (although this may be computed any number of ways, consider for example: $(\text{average}(|2|,|-6|,|-3|,|7|))^2 = 4.5$; the value is squared to account for the multiplication of two pilot strength values). The normalized correlation is thus $C_t^N = -33/2/4.5^2 = -0.815$. This value may then be applied as a multiplicative factor to the next received Sector A differential indicator and added to a current Sector A pilot strength to predict the future pilot strength of that sector. Note that the normalized correlation value has a meaningful magnitude and sign. It is negative indicating that the actual change in MS measured/determined pilot strength values in the past have been opposite in direction/sign to the Sector differential indications. Additionally, its magnitude is less than 1 indicating that, on average, the magnitude of the actual measured/determined pilot strength differences was less than the magnitude of the differential indication from the sector.

Consider further that at time $t_2$, the MS receives a new differential indicator value from network $\Delta PS'_A(t_2+1) = +3$ dB. Assuming that past history of the indicator is relevant to the current time and conditions, the MS may use this new indicator (and the current measured pilot strength at $t_2$, i.e. $PS_A(t_2) = -16$ dB) and the normalized correlation factor that may be continuously calculated to correct it as follows:

$$PS'_A(t_2+1) = PS_A(t_2) + C_t^N \Delta PS'_A(t_2+1)$$
$$= -16 \text{ dB} + (-0.815)(+3 \text{ dB})$$
$$= -18.45 \text{ dB}$$

Notice that applying the correlation factor has predicted that the future pilot strength of sector A actually be lower than the current instead of higher than the current as indicated by the BS. Although this is only one example, it is demonstrative of how the error correction method can correct for indications that are not only erroneous in magnitude but in sign as well.

Notice that if, instead, the Sector A differential indicator values were $\Delta PS'_A(t_1+1) = +6$ dB and $\Delta PS'_A(t_1+2) = -7$ dB (i.e. opposite in sign from above), then the normalized correlation factor would be different:

$$C_t = \Sigma_{i=t-(T-1)\ldots t}(\Delta PS_A(t)\Delta PS'_A(t)) = (+2)(+6)+(-3)(-7) = 33; \text{ and}$$

$$C_t^N = C_t/2/\text{average}(|2|,|6|,|-3|,|-7|))^2 = 33/2/4.5^2 = +0.815$$

This demonstrates how the correlation factor can correct for the magnitude when the signs are coincidental.

In this example, only one BS was discussed; hence the subscript A. However, as described above, typically the method would be used for a number of BSs/sectors.

Although the methodologies for generating and utilizing a relative future activity indicator that provides an indication of the direction and magnitude of the predicted future activity relative to current activity levels for the purpose of enhancing the selection of the source of received communications described hereinabove used a cellular network as an example, the basic concepts of utilizing relative future activity indicators are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, a Telematics modem, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a plurality of base stations (BSs) and a plurality of mobile stations (MSs) communicatively couplable for establishing connections and maintaining communication channels between them, each BS and MS in the system capable of acting as a transmitting entity and a receiving entity, at least one receiving entity for maintaining an eligible set of transmitting entities with which a communication link may be established, a method for enabling at least one receiving entity to select a transmitting entity from the eligible set for establishing a communication link, comprising:

receiving at a receiving entity one or more differential future activity indicator (FAI) bits from one or more transmitting entities in an eligible set of the receiving entity, the one or more FAI bits from the one or more transmitting entities providing an indication of a predicted future change in activity $\Delta A'(t+1)$ relative to a current activity level for a particular transmitting entity;

for one or more of the transmitting entities in the eligible set, deriving an expected change in pilot strength $\Delta PS'_s(t+1)$ from the, one or more FAI bits, determining a current pilot strength, and computing a predicted future pilot strength for a next time period $PS'_s(t+1)$ by adding the expected change in pilot strength $\Delta PS'_s(t+1)$ to the current pilot strength; and selecting one or more transmitting entities from the one or more transmitting entities in the eligible set for establishing a communication link based on the predicted future pilot strengths $PS'_s(t+1)$.

2. The method as recited in claim 1, wherein the indication of a predicted future change in activity relative to a current activity level provided by the one or more FAI bits comprises an indication of a directional change in activity.

3. The method as recited in claim 2, wherein the indication of a predicted future change in activity relative to a current activity level provided by the one or more FAI bits comprises an indication of a magnitude of the change in activity.

4. The method as recited in claim 3, wherein a value of the one or more FAI bits comprises a direct indicator of a magnitude and direction of the predicted future change in activity.

5. The method as recited in claim 1, wherein prior to the step of deriving an expected change in pilot strength $\Delta PS'_s(t+1)$ from the one or more FAI bits, for those transmitting entities in the eligible set from which no FAI bits are received, the method further comprises assigning default FAI bits indicating no change activity.

6. The method as recited in claim 1, wherein prior to the step of deriving an expected change in pilot strength $\Delta PS'_s(t+1)$ from the one or more FAI bits, for those transmitting entities in the eligible set from which no FAI bits are received, the method further comprises assigning default FAI bits indicating no estimate for predicted future change in activity is available.

7. The method as recited in claim 1, wherein prior to the step of deriving an expected change in pilot strength $\Delta PS'_s(t+1)$ from the one or more FAI bits, for those transmitting entities in the eligible set from which no FAI bits are received, the method further comprises assigning FAI bits indicating a particular predicted future change in activity in accordance with information maintained by the receiving entity.

8. The method as recited in claim 3, wherein a value of the one or more FAI bits comprises an indirect indicator capable of being mapped to a stored magnitude and direction of the predicted future change in activity.

9. The method as recited in claim 1, the step of determining a current pilot strength comprising measuring a pilot strength $PS_s(t)$ at the receiving entity, and using the measured pilot strength $PS_s(t)$ as the current pilot strength.

10. The method as recited in claim 1, the step of determining a current pilot strength comprising:
   measuring a pilot strength $PS_s(t)$ at the receiving entity; and
   applying historical pilot strength results stored in the receiving entity to the measured pilot strength $PS_s(t)$ to determine an updated future pilot strength $PS''_s(t+1)$, and using the updated future pilot strength $PS''_s(t+1)$ as the current pilot strength.

11. The method as recited in claim 1, wherein prior to computing a predicted future pilot strength for a next time period $PS'_s(t+1)$, the method further comprises, for each of the one or more transmitting entities in the eligible set that transmitted the one or more FAI bits:
   recalling a measured pilot strength $PS_s(t-1)$ and one or more FAI bits representing a future activity level $A'_s(t-1)$ from a previous time period, and deriving an expected change in pilot strength $\Delta PS'_s(t)$ for the previous time period from the recalled one or more FAI bits;
   computing an actual change in pilot strength $\Delta PS_s(t)$ during the previous time period by subtracting the measured pilot strength during the previous time period $PS_s(t-1)$ from the current pilot strength $PS_s(t)$;
   computing a correlation value for the actual change in pilot strength $\Delta PS_s(t)$ and the expected change in pilot strength $\Delta PS'_s(t)$; and
   biasing the expected change in pilot strength $\Delta PS'_s(t+1)$ in accordance with the computed correlation value.

12. The method as recited in claim 11, wherein prior to biasing the expected change in pilot strength $\Delta PS'_s(t)$ with the correlation value, the method further comprises filtering the correlation value using previously derived correlation values.

13. The method as recited in claim 12, further comprising normalizing the filtered correlation values.

14. The method as recited in claim 11, wherein the step of biasing the expected change in pilot strength $\Delta PS'_s(t+1)$ in accordance with the computed correlation value comprises leaving the expected change in pilot strength $\Delta PS'_s(t+1)$ unchanged if the computed correlation value indicates poor accuracy of the recalled one or more FAI bits from the previous time period.

15. The method as recited in claim 1, wherein prior to the step of receiving the one or more FAI bits at the receiving entity, at each of one or more transmitting entities in the eligible set that transmitted the one or more FAI bits the method further comprises:

determining a current activity level $A(t)$;
determining an expectation of future transmissions and generating a predicted future activity $A'(t+1)$;
computing a predicted future change in activity $\Delta A'(t+1)$ by subtracting the current activity level $A(t)$ from the predicted future activity $A'(t+1)$;
translating the predicted future change in activity $\Delta A'(t+1)$ into the one or more FAI bits and transmitting the one or more FAI bits to the receiving entity.

16. The method as recited in claim 15 wherein, for each of the one or more transmitting entities in the eligible set that transmitted the one or more FAI bits, the method further comprises:
   recalling a future activity level $A'(t)$ from a previous time period;
   computing a prediction error $\Delta A(t)$ representing a difference between current and predicted activity by subtracting the future activity level $A'(t)$ during the previous time period from the current activity level $A(t)$; and
   adjusting the predicted future activity $A'(t+1)$ by the prediction error $\Delta A(t)$.

17. The method as recited in claim 16, wherein for each of the one or more transmitting entities in the eligible set that transmitted the one or more FAI bits, prior to the step of adjusting the predicted future activity $A'(t+1)$ by the prediction error $\Delta A(t)$, the method further comprises filtering the prediction error $\Delta A(t)$ using previously derived $\Delta A(t)$ values.

18. The method as recited in claim 16, the step of adjusting the predicted future activity $A'(t+1)$ by the prediction error $\Delta A(t)$ comprising adding the prediction error $\Delta A(t)$ to the predicted future activity $A'(t+1)$.

19. The method as recited in claim 17, the step of adjusting the predicted future activity $A'(t+1)$ by the prediction error $\Delta A(t)$ comprising limiting the predicted future activity $A'(t+1)$ to a range of values established by past $\Delta A(t)$ values.

20. A first transceiver communicatively couplable to one or more second transceivers for establishing a connection and maintaining a communication channel with the one or more second transceivers, the first transceiver configured as a receiving entity for maintaining an eligible set of one or more second transceivers with which a communication link may be established, the first transceiver comprising:
   a first transceiver processor programmed for
      receiving one or more differential future activity indicator (FAI) bits from one or more second transceivers in an eligible set of the first transceiver, the one or more FAI bits from the one or more second transceivers providing an indication of a predicted future change in activity $\Delta A'(t+1)$ relative to a current activity level for a particular second transceiver;
      for one or more of the second transceivers in the eligible set,
         deriving an expected change in pilot strength $\Delta PS'_s(t+1)$ from the one or more FAI bits,
         determining a current pilot strength, and
         computing a predicted future pilot strength for a next time period $PS'_s(t+1)$ by adding the expected change in pilot strength $\Delta PS'_s(t+1)$ to the current pilot strength; and
      selecting one or more second transceivers from the one or more second transceivers in the eligible set for establishing a communication link based on the predicted future pilot strengths $PS'_s(t+1)$.

21. The first transceiver as recited in claim 20, wherein the indication of a predicted future change in activity relative to a current activity level provided by the one or more FAI bits comprises an indication of a directional change in activity.

22. The first transceiver as recited in claim 21, wherein the indication of a predicted future change in activity relative to a current activity level provided by the one or more FAI bits comprises an indication of a magnitude of the change in activity.

23. The first transceiver as recited in claim 22, wherein a value of the one or more FAI bits comprises a direct indicator of a magnitude and direction of the predicted future change in activity.

24. The first transceiver as recited in claim 20, wherein prior to deriving an expected change in pilot strength $\Delta PS'_s(t+1)$ from the one or more FAI bits, for those second transceivers in the eligible set from which no FAI bits are received, the first transceiver processor is further programmed for assigning default FAI bits indicating no change activity.

25. The first transceiver as recited in claim 20, wherein prior to deriving an expected change in pilot strength $\Delta PS'_s(t+1)$ from the one or more FAI bits, for those second transceivers in the eligible set from which no FAI bits are received, the first transceiver processor is further programmed for assigning default FAI bits indicating no estimate for predicted future change in activity is available.

26. The first transceiver as recited in claim 20, wherein prior to the deriving an expected change in pilot strength $\Delta PS'_s(t+1)$ from the one or more FAI bits, for those second transceivers in the eligible set from which no FAI bits are received, the first transceiver processor is further programmed for assigning FAI bits indicating a particular predicted future change in activity in accordance with information maintained by the first transceiver.

27. The first transceiver as recited in claim 22, wherein a value of the one or more FAI bits comprises an indirect indicator capable of being mapped to a stored magnitude and direction of the predicted future change in activity.

28. The first transceiver as recited in claim 20, the first transceiver processor further programmed for determining the current pilot strength by measuring a pilot strength $PS_s(t)$ at the first transceiver, and using the measured pilot strength $PS_s(t)$ as the current pilot strength.

29. The first transceiver as recited in claim 20, wherein for each of the one or more second transceivers in the eligible set that transmitted the one or more FAI bits, the first transceiver processor is further programmed for determining the current pilot strength by:
measuring a pilot strength $PS_s(t)$ at the first transceiver; and
applying historical pilot strength results stored in the first transceiver to the measured pilot strength $PS_s(t)$ to determine an updated future pilot strength $PS''_s(t+1)$, and using the updated future pilot strength $PS''_s(t+1)$ as the current pilot strength.

30. The first transceiver as recited in claim 20, wherein for each of the one or more second transceivers in the eligible set that transmitted the one or more FAI bits, prior to adding the expected change in pilot strength $\Delta PS'_s(t+1)$ to the current pilot strength to compute a predicted future pilot strength for the next time period $PS'_s(t+1)$, the first transceiver processor is further programmed for:
recalling a measured pilot strength $PS_s(t-1)$ and one or more FAI bits representing a future activity level $A'(t-1)$ from a previous time period, and deriving an expected change in pilot strength $\Delta PS'_s(t)$ for the previous time period from the recalled one or more FAI bits;

computing an actual change in pilot strength $\Delta PS_s(t)$ during the previous time period by subtracting the measured pilot strength during the previous time period $PS_s(t-1)$ from the current pilot strength $PS_s(t)$;
computing a correlation value for the actual change in pilot strength $\Delta PS_s(t)$ and the expected change in pilot strength $\Delta PS'_s(t)$; and
biasing the expected change in pilot strength $\Delta PS'_s(t+1)$ in accordance with the computed correlation value.

31. The first transceiver as recited in claim 30, wherein prior to biasing the expected change in pilot strength $\Delta PS'_s(t)$ with the correlation value, the first transceiver processor is further programmed for filtering the correlation value using previously derived correlation values.

32. The first transceiver as recited in claim 31, the first transceiver processor further programmed for normalizing the filtered correlation values.

33. The first transceiver as recited in claim 30, wherein the first transceiver processor is further programmed for biasing the expected change in pilot strength $\Delta PS'_s(t+1)$ in accordance with the computed correlation value by leaving the expected change in pilot strength $\Delta PS'_s(t+1)$ unchanged if the computed correlation value indicates poor accuracy of the recalled one or more FAI bits from the previous time period.

34. A second transceiver communicatively couplable to a first transceiver for establishing a connection and maintaining a communication channel with the first transceiver, the first transceiver configured as a receiving entity for maintaining an eligible set of one or more second transceivers with which a communication link may be established; the second transceiver configured as a transmitting entity for assisting in the first transceiver's selection of one second transceiver from the eligible set for establishing a communication link, the second transceiver comprising:
a second transceiver processor programmed for
determining a current activity level $A(t)$ for the second transceiver;
determining an expectation of future transmissions and generating a predicted future activity $A'(t+1)$ for the second transceiver;
computing a predicted future change in activity $\Delta A'(t+1)$ for the second transceiver by subtracting the current activity level $A(t)$ from the predicted future activity $A'(t+1)$;
translating the predicted future change in activity $\Delta A'(t+1)$ into the one or more FAI bits and transmitting the one or more FAI bits to the first transceiver.

35. The second transceiver as recited in claim 34, the second transceiver processor further programmed for:
recalling a future activity level $A'(t)$ for the second transceiver from a previous time period;
computing a prediction error $\Delta A(t)$ representing a difference between current and predicted activity for the second transceiver by subtracting the future activity level $A'(t)$ during the previous time period from the current activity level $A(t)$; and
adjusting the predicted future activity $A'(t+1)$ by the prediction error $\Delta A(t)$.

36. The second transceiver as recited in claim 35, wherein prior to adjusting the predicted future activity $A'(t+1)$ by the prediction error $\Delta A(t)$, the second transceiver processor is further programmed for filtering the prediction error $\Delta A(t)$ using previously derived $\Delta A(t)$ values.

37. The second transceiver as recited in claim 35, the second transceiver processor further programmed for adjusting the predicted future activity $A'(t+1)$ by the prediction error $\Delta A(t)$ by adding the prediction error $\Delta A(t)$ to the predicted future activity $A'(t+1)$.

38. The second transceiver as recited in claim 36, the second transceiver processor further programmed for adjusting the predicted future activity $A'(t+1)$ by the prediction error $\Delta A(t)$ by limiting the predicted future activity $A'(t+1)$ to a range of values established by past $\Delta A(t)$ values.

* * * * *